United States Patent
Kariyama et al.

(10) Patent No.: US 10,144,484 B2
(45) Date of Patent: Dec. 4, 2018

(54) BICYCLE HYDRAULIC OPERATING DEVICE

(71) Applicant: Shimano Inc., Sakai, Osaka (JP)

(72) Inventors: Osamu Kariyama, Sakai (JP); Nobuyoshi Fujii, Sakai (JP); Tatsuya Matsushita, Sakai (JP); Takaaki Fujiwara, Sakai (JP)

(73) Assignee: SHIMANO INC., Osaka (JP)

( * ) Notice: Subject to any disclaimer, the term of this patent is extended or adjusted under 35 U.S.C. 154(b) by 233 days.

(21) Appl. No.: 15/052,762

(22) Filed: Feb. 24, 2016

(65) Prior Publication Data

US 2017/0240244 A1    Aug. 24, 2017

(51) Int. Cl.
*B62L 3/02* (2006.01)
*B62K 23/06* (2006.01)
*F15B 1/26* (2006.01)

(52) U.S. Cl.
CPC .............. *B62L 3/023* (2013.01); *B62K 23/06* (2013.01); *F15B 1/26* (2013.01)

(58) Field of Classification Search
CPC ................................. B60T 11/22; B60T 11/228
USPC ................................. 60/584, 585, 588, 594
See application file for complete search history.

(56) References Cited

U.S. PATENT DOCUMENTS

| | | | | |
|---|---|---|---|---|
| 2,310,976 A * | 2/1943 | Masteller | ................ | B60T 11/22 60/587 |
| 2,687,015 A * | 8/1954 | Edwards | ................ | B60T 11/22 180/90.6 |
| 4,893,472 A * | 1/1990 | Barker | ................ | B60T 11/22 60/562 |
| 4,924,673 A * | 5/1990 | Barker | ................ | B60T 11/22 60/585 |
| 5,950,772 A * | 9/1999 | Buckley | ................ | B62K 23/06 188/18 A |
| 6,321,784 B1 | 11/2001 | Leng | | |
| 7,222,486 B2 * | 5/2007 | Leigh-Monstevens | ................ | F02M 55/007 60/562 |
| 7,546,909 B2 * | 6/2009 | Campbell | ................ | B60T 11/22 188/24.15 |
| 7,578,375 B2 * | 8/2009 | Lin | ................ | B60T 7/10 188/344 |
| 8,776,966 B2 * | 7/2014 | Hirose | ................ | B60T 7/102 188/344 |
| 9,415,831 B2 * | 8/2016 | Kariyama | ................ | B62L 3/023 |
| 2009/0152063 A1 * | 6/2009 | Tsai | ................ | B60T 11/16 188/344 |
| 2010/0064838 A1 * | 3/2010 | Siew | ................ | B60T 11/22 74/491 |

(Continued)

FOREIGN PATENT DOCUMENTS

| | | |
|---|---|---|
| DE | 20017142 U1 | 12/2000 |
| DE | 20313447 U1 | 10/2003 |
| DE | 202011000141 U1 | 3/2011 |

(Continued)

*Primary Examiner* — F. Daniel Lopez
*Assistant Examiner* — Matthew Wiblin

(57) ABSTRACT

A bicycle hydraulic operating device is provided with a cylinder including a cylinder bore, a first reservoir tank including a first reservoir opening, and a second reservoir tank including a second reservoir opening. The first reservoir tank is in fluid communication with the cylinder bore, and the second reservoir tank is in fluid communication with the cylinder bore.

18 Claims, 8 Drawing Sheets

(56) References Cited

U.S. PATENT DOCUMENTS

2013/0174543 A1 7/2013 Nago et al.
2014/0144275 A1* 5/2014 Kariyama ............... B62L 3/023
　　　　　　　　　　　　　　　　　　　　　　　　74/488

FOREIGN PATENT DOCUMENTS

| DE | 102013000056 A1 | 7/2013 |
| DE | 102012109965 A1 | 4/2014 |
| DE | 102014210186 A1 | 12/2014 |

* cited by examiner

BICYCLE HYDRAULIC OPERATING DEVICE

TECHNICAL FIELD

The present invention generally relates to a bicycle component and, more particularly, to a bicycle hydraulic device.

BACKGROUND ART

There are various types of bicycle hydraulic systems. For example, a bicycle hydraulic brake system includes a hydraulic operating device, such as a brake lever device, and a hydraulic operated device, such as a brake caliper. In the hydraulic operating device, a master piston is moved in a master cylinder in accordance with the pivoting of an operating portion such as a brake lever. When the master piston moves, fluid (oil, for example) is discharged out of the master cylinder and moved through a hydraulic hose to drive a slave piston in a slave cylinder of the hydraulic operated device.

SUMMARY

In the bicycle hydraulic system, it is desirable that the output be increased and the controllability of the output be improved. For example, it is desirable for a cyclist that the braking force be powerful and that the braking force be finely controlled. Further, improvement in maintenance of bicycle components and reduction in size and weight of bicycle components are always the underlying goals of the bicycle industry.

A first aspect of the present invention is a bicycle hydraulic operating device provided with a cylinder including a cylinder bore, a first reservoir tank including a first reservoir opening, and a second reservoir tank including a second reservoir opening. The first reservoir tank is in fluid communication with the cylinder bore. The second reservoir tank is in fluid communication with the cylinder bore.

A further aspect of the present invention is a bicycle hydraulic operating device provided with a cylinder including a cylinder bore, a first reservoir tank, a second reservoir tank, a first channel that connects the first reservoir tank to the cylinder bore, and a second channel that connects the second reservoir tank to either one of the cylinder bore and the first reservoir tank.

In a second aspect, the bicycle hydraulic operating device according to any one of the preceding aspects further includes a first diaphragm fitted to the first reservoir opening. The first diaphragm defines a first liquid chamber and a first air chamber in the first reservoir tank. A second diaphragm is fitted to the second reservoir opening. The second diaphragm defines a second liquid chamber and a second air chamber in the second reservoir tank.

In a third aspect, the bicycle hydraulic operating device according to any one of the preceding aspects further includes a first lid that covers the first reservoir opening and a second lid that covers the second reservoir opening.

In a fourth aspect according to any one of the preceding aspects, the first reservoir tank and the second reservoir tank extend in a direction parallel to a cylinder bore axis of the cylinder.

In a fifth aspect according to the fourth aspect, the first reservoir tank and the second reservoir tank are each located proximate to the cylinder bore in a radial direction of the cylinder bore.

In a sixth aspect according to any one of the preceding aspects, the first reservoir opening and the second reservoir opening are non-circular.

In an eighth aspect according to the first aspect, the bicycle hydraulic operating device further includes a first channel that connects the first reservoir tank to the cylinder bore.

In a ninth aspect according to the eighth aspect, the first reservoir tank is directly connected to the cylinder bore by the first channel, and the second reservoir tank is indirectly connected to the cylinder bore via the first reservoir tank and the first channel.

In a tenth aspect according to the eighth aspect, the bicycle hydraulic operating device further includes a bleeding port that connects at least one of the first reservoir tank and the second reservoir tank to outside the bicycle hydraulic operating device and a sealing plug coupled to the bleeding port.

In an eleventh aspect according to the tenth aspect, the bleeding port is aligned with the first channel.

In a twelfth aspect according to the eighth aspect, the bicycle hydraulic operating device further includes a second channel that connects the second reservoir tank to the first reservoir tank.

In a thirteenth aspect according to the twelfth aspect, the second channel is connected to the first reservoir tank at a side opposite to the first reservoir opening.

In a fourteenth aspect according to the thirteenth aspect, the second channel is connected to the second reservoir tank at a side opposite to the second reservoir opening.

In a fifteenth aspect according to any one of the preceding aspects, the bicycle hydraulic operating device further includes a single main body including the cylinder bore, the first reservoir tank, and the second reservoir tank.

In a sixteenth aspect according to the fifteenth aspect, the main body is configured so that at least a portion of the main body is arranged in a pipe member of a bicycle when the hydraulic operating device is attached to the bicycle.

In a seventeenth aspect according to any one of the preceding aspects, the bicycle hydraulic operating device further includes a lever provided to pivot about a lever axis between a rest position and an operated position and a piston located in the cylinder bore and moved between a home position and an actuated position in accordance with the pivoting of the lever.

In an eighteenth aspect according to the seventeenth aspect, the bicycle hydraulic operating device is further provided with a non-hydraulic operating unit including at least one of a cable operating unit and an electric switch.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

Figure 1:
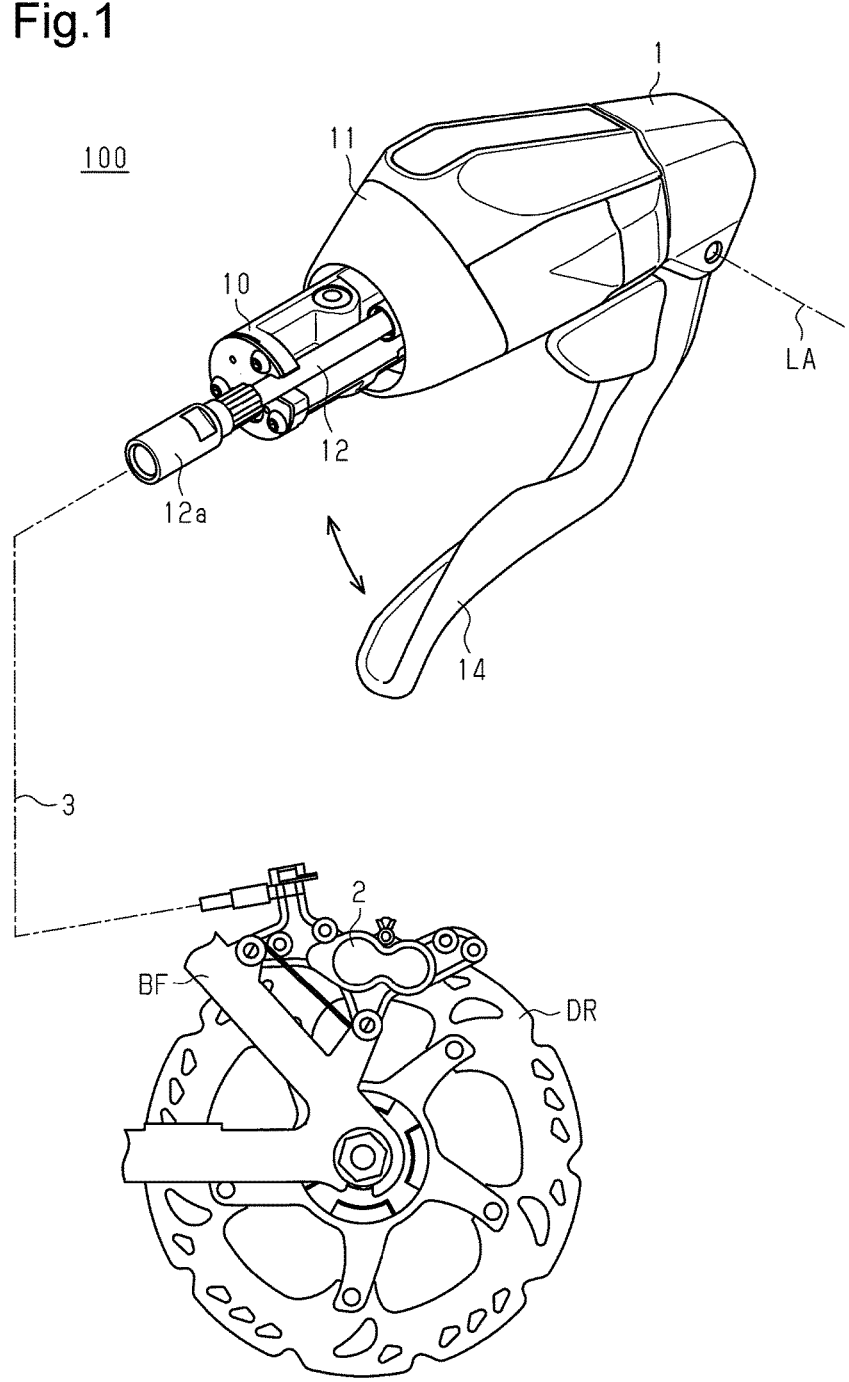
FIG. 1 is a schematic diagram of a bicycle hydraulic system including one embodiment of a hydraulic operating device.

A bicycle hydraulic system 100 will now be described with reference to FIG. 1. The bicycle hydraulic system 100 includes a bicycle hydraulic operating device 1 (hereinafter simply referred to as the hydraulic operating device 1) such as a brake lever device, a bicycle hydraulic operated device 2 (hereinafter simply referred to as the hydraulic operated device 2), and a hydraulic hose 3 that connects the hydraulic operating device 1 and the hydraulic operated device 2 in a manner allowing for fluid communication. The hydraulic operating device 1 is typically attached to a handle bar HB but may be attached to a bicycle frame BF. The hydraulic operated device 2 is normally attached to, for example, the bicycle frame BF. The hydraulic hose 3 is in fluid connection with a main body 10 of the hydraulic operating device 1 through, for example, a hose adapter 12. An outermost cover 11 at least partially covers the main body 10.

Figure 2:
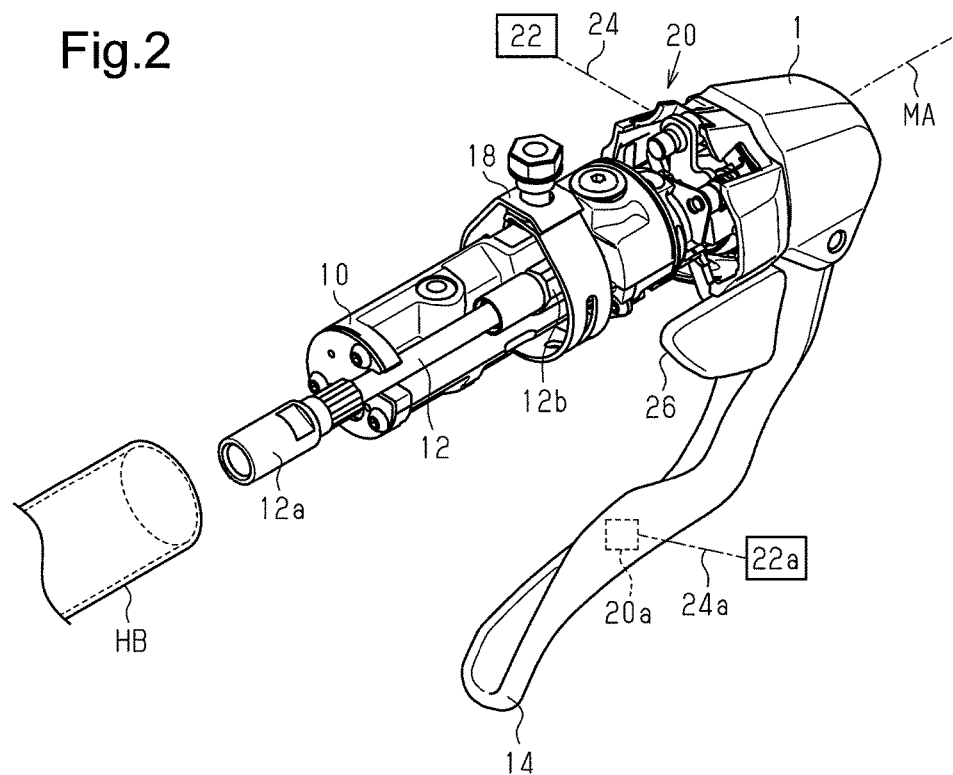
FIG. 2 is a perspective view showing a bicycle hydraulic operating device of FIG. 1 without an outermost cover.

FIG. 2 shows the hydraulic operating device 1 without the outermost cover 11. The hose adapter 12 has a distal end where a quick coupler 12a is connected to the hydraulic hose 3 and a basal end where a head 12b is fixed to the main body 10 by, for example, a bolt. The head 12b is in communication with an outlet 38 (refer to FIG. 9) of the main body 10. The main body 10 and the hose adapter 12 can be inserted into the handle bar HB from an open end of the handle bar HB. More specifically, the main body 10 is configured so that at least a portion of the main body 10 is arranged in a pipe member of the bicycle (in this case, handle bar HB of bicycle frame BF) when the hydraulic operating device 1 is attached to the bicycle. The hydraulic operating device 1 is coupled to the handle bar HB by a clamp 18.

Figure 3:
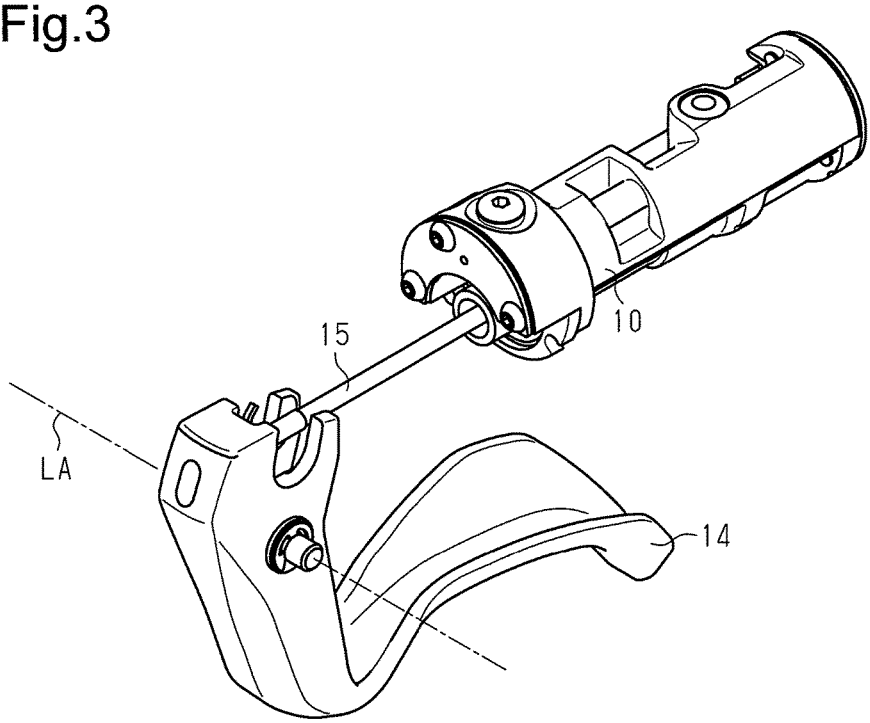
FIG. 3 is a perspective view showing the bicycle hydraulic operating device of FIG. 2 illustrating a lever coupled to a piston of a cylinder.

As shown in FIGS. 1 and 3, the hydraulic operating device 1 includes an operating member such as a lever 14 that is pivotal about a lever axis LA. The lever 14 is connected to a link mechanism including a connecting rod 15 that projects from the main body 10. When the lever 14 is pivoted from a rest position to an operated position, the hydraulic operating device 1 discharges fluid. The hydraulic operated device 2 includes a slave piston that is configured to press a brake pad against a rotor DR when moved by the operation of the hydraulic operating device 1. This generates a braking force with the hydraulic operated device 2.

As shown in FIG. 2, the hydraulic operating device 1 in the present embodiment may further include a cable operating unit 20. The cable operating unit 20 is connected to a cable-type operated device 22 by a control cable 24 that may be a Bowden cable. The cable operating unit 20 includes an additional lever 26 that is operable independently from the pivoting of the lever 14. The additional lever 26, which serves as an additional operating member, is pivotal, for example, about a longitudinal axis MA of the main body 10. The lever 14 is held by the cable operating unit 20 to be pivotal about the longitudinal axis MA and serves as a shift lever. The cable operating unit 20 controls the cable-type operated device 22 in accordance with the pivoting of the additional lever 26 about the longitudinal axis MA.

The hydraulic operating device 1 may include at least one electric switch 20a instead of or in addition to the cable operating unit 20. The electric switch 20a is configured to electrically control an electrical-type operated device 22a through a wired or wireless signal link 24a. The electric switch 20a may be a transmitter or a portion of a microcomputer that is capable of performing communication with the electrical-type operated device 22a. Alternatively, the electric switch 20a may be electrically connected to such a transmitter or a microcomputer.

More specifically, the hydraulic operating device 1 may further include a non-hydraulic operating unit that includes at least one of the cable operating unit 20 and the electric switch 20a. The cable-type operated device 22 and the electrical-type operated device 22a operated by such a non-hydraulic operating unit may each be referred to as a non-hydraulic operated device. Although not particularly limited, the non-hydraulic operating device may be a mechanical or electrical derailleur, a mechanical or electrical suspension, or a mechanical or electrical adjustable seatpost.

The hydraulic circuit of the hydraulic operating device 1 will now be described with reference to FIGS. 4 to 9.

The hydraulic operating device 1 includes a cylinder 30, a first reservoir opening 41, a first reservoir tank 40, a second reservoir opening 51, and a second reservoir tank 50. The cylinder 30 includes a cylinder bore 32. The first reservoir tank 40 is in fluid communication with the cylinder bore 32. The second reservoir tank 50 is in fluid communication with the cylinder bore 32.

Figure 5:
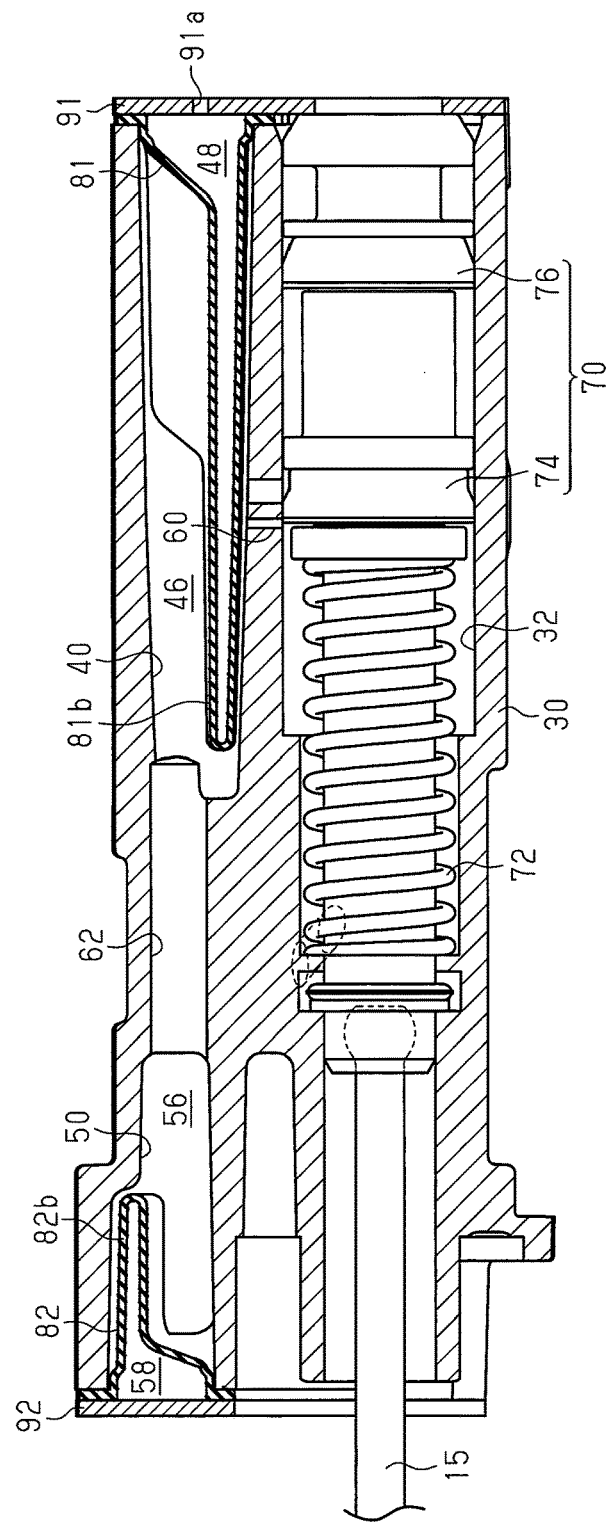
FIG. 5 is a schematic cross-sectional view of the bicycle hydraulic operating device.
Figure 6:
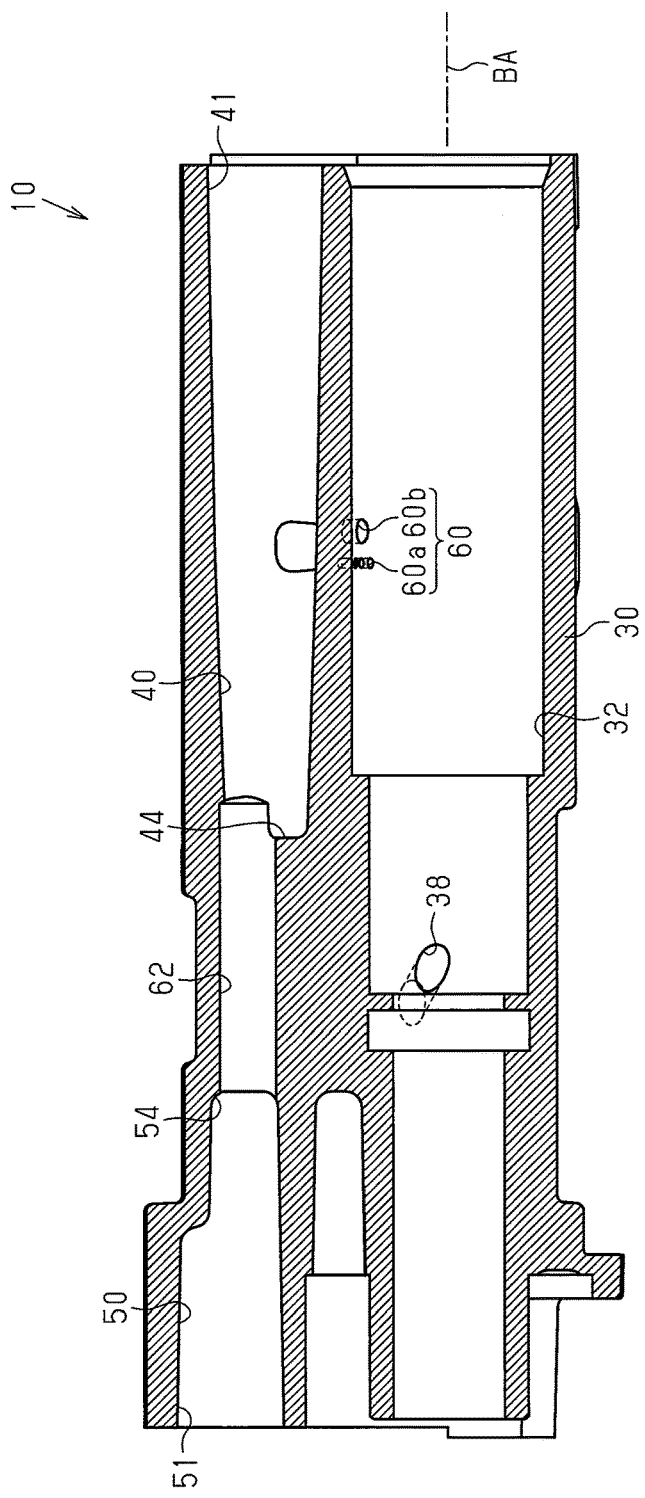
FIG. 6 is a schematic cross-sectional view of a main body.
Figure 7:
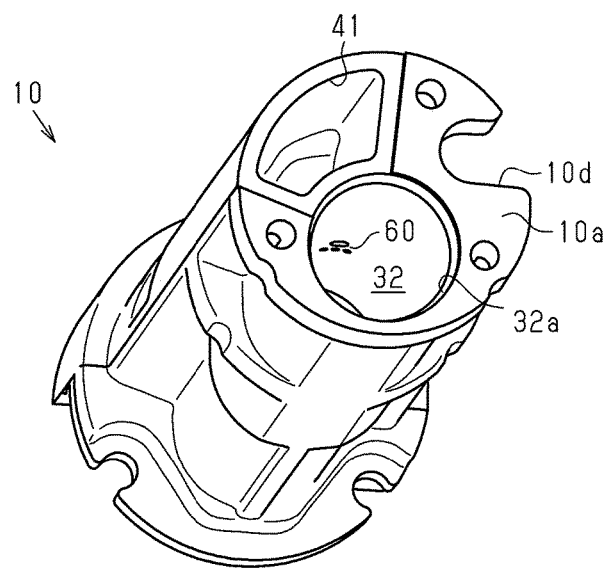
FIG. 7 is a perspective view of the main body taken from a first end surface side that includes a first reservoir opening.

As shown in FIGS. 5 and 6, the hydraulic operating device 1 may further include a first channel 60 that connects the first reservoir tank 40 to the cylinder bore 32. FIG. 7 shows the opening of the first channel 60 in the cylinder bore 32.

Figure 8:
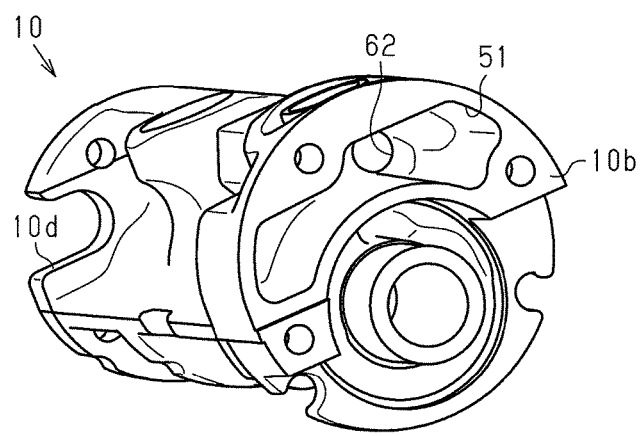
FIG. 8 is a perspective view of the main body taken from a second end surface side that includes a second reservoir opening.

The hydraulic operating device 1 may further include a second channel 62 that connects the second reservoir tank 50 to the first reservoir tank 40. The second channel 62 is connected to the first reservoir tank 40 at a side 44 (first step) opposite to the first reservoir opening 41. Further, the second channel 62 is connected to the second reservoir tank 50 at a side 54 (second step) opposite to the second reservoir opening 51. FIG. 8 also shows the second channel 62 that is in communication with the second reservoir tank 50. The second channel 62 typically has a circular cross-section.

When the bicycle hydraulic system 100 is in use, the cylinder bore 32, the first reservoir tank 40, the second reservoir tank 50, and the second channel 62 are filled with a fluid such as machine oil. The fluid of the first reservoir tank 40 and the second reservoir tank 50 enters the cylinder bore 32 and is discharged through the commonly shared outlet 38 out of the hydraulic operating device 1 and into the hydraulic hose 3. In this embodiment, the first reservoir tank 40 is directly connected to the cylinder bore 32 by the first channel 60. Further, the second reservoir tank 50 is indirectly connected to the cylinder bore 32 through the second reservoir tank 50, the second channel, the first reservoir tank 40, and the first channel 60.

The cylinder bore 32, the first reservoir tank 40, and the second reservoir tank 50 are preferably located in the same main body 10, which preferably has a one-piece structure. The main body 10 is normally a metal block and preferably a non-ferrous block of an aluminum alloy, a magnesium alloy, or the like.

The first reservoir tank 40 and the second reservoir tank 50 extend in a direction parallel to the cylinder bore axis BA of the cylinder bore 32. The first reservoir tank 40 and the second reservoir tank 50 are each located proximate to the cylinder bore 32 in the radial direction of the cylinder bore 32. In other words, the first reservoir tank 40 and the second reservoir tank 50 are each arranged side by side to the cylinder bore 32. In this embodiment, the cylinder bore axis BA is parallel to the longitudinal axis MA of the main body 10 (refer to FIG. 2).

Figure 4:
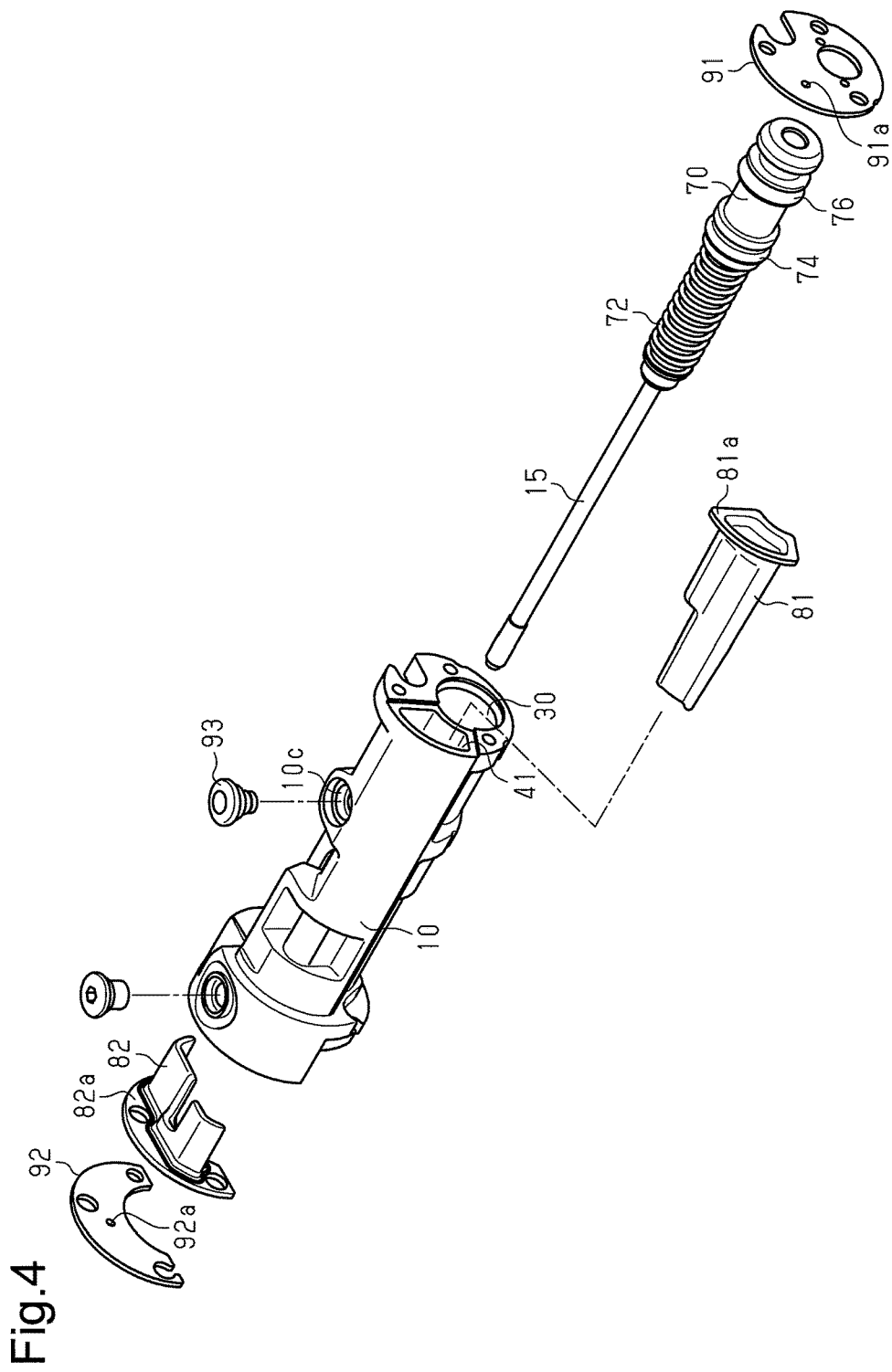
FIG. 4 is a schematic exploded perspective view of the bicycle hydraulic operating device.

As shown in FIGS. 4 and 5, the hydraulic operating device 1 further includes a piston 70 (master piston) arranged in the cylinder bore 32 and moved between a home position and an actuated position in accordance with the pivoting of the lever 14. The piston 70 is coupled to the connecting rod 15. When the lever 14 is pivoted from the rest position to the operated position, the connecting rod 15 pulls the piston 70 from the home position to the actuated position. When a user (cyclist) releases the lever 14, the piston 70 is returned to the home position by the biasing force of a piston return spring 72.

When the piston 70 is located at the home position, the first reservoir tank 40 and the second reservoir tank 50 are in communication with the cylinder bore 32. When the piston 70 is moved from the home position by a predetermined distance toward the actuated position, the piston 70 closes the first channel 60. This fluidly disconnects the first reservoir tank 40 and the second reservoir tank 50 from the cylinder bore 32. As shown in FIG. 6, the first channel 60 includes, for example, a primary port 60a and a secondary port 60b that are separated from each other along the cylinder bore axis BA. The piston 70 includes a first cup seal 74 and a second cup seal 76 that are in contact with the wall surface of the cylinder bore 32. The first cup seal 74 and the second cup seal 76 are separated from each other along the cylinder bore axis BA. When the piston 70 is located at the home position, the first cup seal 74 is located between the primary port 60a and the secondary port 60b of the first channel 60. Accordingly, the first reservoir tank 40 and the second reservoir tank 50 are in communication with the cylinder bore 32 through the first channel 60. In this embodiment, when the piston 70 is moved by the predetermined distance from the home position toward the actuated position and the first cup seal 74 passes by the primary port 60a, the first reservoir tank 40 and the second reservoir tank 50 are fluidly disconnected from the cylinder bore 32. The cylinder bore 32 and/or the piston 70 may include a seal element such as an O-ring when necessary.

As shown in FIGS. 4 and 5, the hydraulic operating device 1 further includes a first diaphragm 81, which is fitted to the first reservoir opening 41, and a second diaphragm 82, which is fitted to the second reservoir opening 51. The first diaphragm 81 defines a first liquid chamber 46 and a first air chamber 48 in the first reservoir tank 40. The second diaphragm 82 defines a second liquid chamber 56 and a second air chamber 58 in the second reservoir tank 50. It is preferred that the first diaphragm 81 include a flange 81a that is in close contact with the first reservoir opening 41. Further, it is preferred that the second diaphragm 82 include a flange 82a that is close contact with the corresponding second reservoir opening 51. In this embodiment, the first diaphragm 81 is an elastomer member including a distal portion 81b that extends into the first reservoir tank 40. In the same manner, the second diaphragm 82 is an elastomer member including a constricted portion 82b that extends into the second reservoir tank 50. The material and shape of the first diaphragm 81 and the second diaphragm 82 may be set to allow for elastic deformation in accordance with the flow or pressure of the fluid in the corresponding reservoir tank.

As shown in FIG. 4, it is preferred that the hydraulic operating device 1 include a first lid 91 and a second lid 92. The first lid 91 covers the first reservoir opening 41 in cooperation with the first diaphragm 81. The second lid 92 covers the second reservoir opening 51 in cooperation with the second diaphragm 82. The first lid 91 and the second lid 92 are each fastened to the main body 10 by bolts (refer to FIG. 2). The first lid 91 includes a vent 91a that allows air to flow between the first air chamber 48 and the outside of the main body 10 when the first diaphragm 81 is elastically deformed. The second lid 92 includes a vent 92a that allows air to flow between the second air chamber 58 and the outside of the main body 10 when the second diaphragm 82 is elastically deformed. In this embodiment, the first lid 91 includes a further vent that allows air to flow when the piston 70 moves.

As shown in FIGS. 4, 7, and 8, the main body 10 may be a cylindrical elongated block. The main body 10 includes a first end surface 10a and a second end surface 10b, which is located at the opposite side of the first end surface 10a. As shown in FIG. 7, the first end surface 10a includes the first reservoir opening 41 and a cylinder opening 32a of the cylinder bore 32. As shown in FIG. 8, the second end surface 10b includes the second reservoir opening 51.

In this embodiment, the first reservoir opening 41 and the second reservoir opening 51 are arranged to at least partially encompass the longitudinal axis MA of the main body 10 (refer to FIG. 2). The cylinder opening 32a is circular. The first reservoir opening 41 and the second reservoir opening 51 are non-circular. The first reservoir opening 41 and the second reservoir opening 51 differ in shape.

Figure 9:
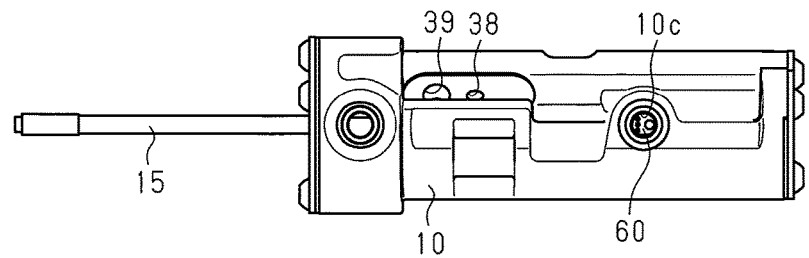
FIG. 9 is a plan view of the main body.

As shown in FIG. 4, it is preferred that the hydraulic operating device 1 further include a bleeding port 10c, which connects at least one of the first reservoir tank 40 and the second reservoir tank 50 to the outside of the hydraulic operating device 1, and a sealing plug 93, which is coupled to the bleeding port 10c. The bleeding port 10c is located in, for example, the upper surface of the main body 10. The sealing plug 93 seals the bleeding port 10c in a leak-proof manner. In this embodiment, the bleeding port 10c is directly connected to the first reservoir tank 40. As shown in FIG. 9, the bleeding port 10c is aligned with the first channel 60.

Instead of or in addition to the bleeding port 10c, the hydraulic operating device 1 may include a bleeding port that connects the second reservoir tank 50 to the outside of the hydraulic operating device 1 and a sealing plug for the bleeding port.

As shown in FIG. 6, the outlet 38 preferably extends diagonally in a direction that intersects the cylinder bore axis BA. As shown in FIG. 9, the outlet 38 opens in, for example, an upper surface of the main body 10. A bolt hole 39 is arranged in the vicinity of the outlet 38. A bolt is fastened to the bolt hole 39 to fix the head 12b of the hose adapter 12 to the main body 10. The outlet 38 is in fluid communication with the hydraulic hose 3 through the hose adapter 12. When necessary, seal elements such as O-rings (not shown) may be arranged in the outlet 38 and the bolt hole 39.

As shown in FIGS. 7 and 8, the main body 10 includes a hose window 10d, which may be a notch. The hose window 10d may be configured to, for example, support or receive the hose adapter 12 and/or the hydraulic hose 3 substantially parallel to the cylinder bore axis BA. The first lid 91 is provided with a notch corresponding to the hose window 10d.

The hydraulic operating device 1 of the present invention has the advantages described below.

(1) The hydraulic operating device 1 includes the first reservoir tank 40 and the second reservoir tank 50 that are in communication with the cylinder bore 32. This allows fluid from the first reservoir tank 40 and the second reservoir tank 50 to be supplied to the same cylinder bore 32. Thus, the desirable fluid discharge amount may be obtained while satisfying the restricted size requirements imposed on the entire hydraulic operating device 1.

(2) The first diaphragm 81 and the second diaphragm 82 may be separately replaced. This facilitates maintenance of the hydraulic operating device 1. Further, shapes of the first diaphragm 81 and the second diaphragm 82 may be independently determined. This allows for fine hydrokinetic adjustment of the flow of fluid in the first reservoir tank 40 and the second reservoir tank 50.

(3) The first lid 91 and the second lid 92 allow the first reservoir opening 41 and the second reservoir opening 51 to be separately accessed from the outside of the hydraulic operating device 1. This facilitates maintenance of the hydraulic operating device 1. Further, for example, one or both of the first lid 91 and the second lid 92 may be removed to clean the oil passage in the main body 10.

(4) The second channel 62 connects the first reservoir tank 40 and the second reservoir tank 50. This improves the freedom of design for the locations and shapes of the first reservoir tank 40 and the second reservoir tank 50 and allows the hydraulic operating device 1 to have a compact configuration.

(5) The second channel 62 is connected to the first reservoir tank 40 at the side 44 opposite to the first reservoir opening 41. This allows the second channel 62 to be accessed from the first reservoir opening 41 and facilitates maintenance of the hydraulic operating device 1.

(6) The second channel 62 is connected to the second reservoir tank 50 at the side 54 opposite to the second reservoir opening 51. This allows the second channel 62 to be accessed from the second reservoir opening 51 and facilitates maintenance of the hydraulic operating device 1.

(7) The first reservoir tank 40 and the second reservoir tank 50 are arranged in a direction parallel to the cylinder bore axis BA. This allows the main body 10 to be reduced in diameter and allows the hydraulic operating device 1 to have a compact configuration.

(8) The first reservoir tank 40 and the second reservoir tank 50 are arranged side by side to the cylinder bore 32. This allows the main body 10 to be reduced in diameter and allows the hydraulic operating device 1 to have a compact configuration.

(9) The first reservoir opening 41 and the second reservoir opening 51 are non-circular. This allows for a decrease in the distance from the first reservoir tank 40 and the second reservoir tank 50 to the cylinder bore 32 in a direction intersecting the cylinder bore BA. Accordingly, the main body 10 may be reduced in diameter, and the hydraulic operating device 1 may have a compact configuration.

(10) The first reservoir opening 41 and the second reservoir opening 51 differ in shape. This increases the freedom of design for the first reservoir tank 40 and the second reservoir tank 50. Thus, the desirable fluid discharge amount may be obtained while satisfying the restricted size requirements.

(11) At least one of the first reservoir tank 40 and the second reservoir tank 50 is connected to the cylinder bore 32 by the first channel 60. Thus, fluid can be directly supplied to the cylinder bore 32 from one or both of the first reservoir tank 40 and the second reservoir tank 50.

Figure 10:
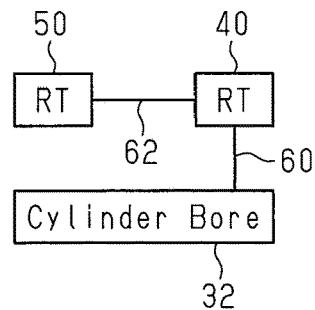
FIG. 10 is a block diagram of the hydraulic operating device.

(12) As schematically shown in FIG. 10, the first reservoir tank 40 is directly connected to the cylinder bore 32 by the first channel 60, and the second reservoir tank 50 is indirectly connected to the cylinder bore 32 via the first reservoir tank 40 and the second reservoir tank 50. This allows fluid to be directly supplied to the cylinder bore 32 from the first reservoir tank 40 and allows fluid to be indirectly supplied to the cylinder bore 32 from the second reservoir tank 50 via the first reservoir tank 40.

(13) The bleeding port 10c allows air to be released out of the oil passage that includes the first reservoir tank 40 and the second reservoir tank 50. Further, the bleeding port 10c cooperates with the first reservoir opening 41 and/or the second reservoir opening 51 to facilitate access to the first reservoir tank 40 and/or the second reservoir tank 50 from the outside of the hydraulic operating device 1. This facilitates maintenance of the hydraulic operating device 1.

(14) The bleeding port 10c is aligned with the first channel 60. This allows the first channel 60 to be accessed through the bleeding port 10c from the outside of the hydraulic operating device 1 and facilitates maintenance of the hydraulic operating device 1. Further, the first channel 60 may easily be formed.

(15) The use of the main body 10 that integrates the cylinder bore 32, the first reservoir tank 40, and the second reservoir tank 50 allows for reduction in the manufacturing cost as compared with when these components are separately prepared.

(16) The movement of the piston 70 between the home position and the actuated position in accordance with the pivoting of the lever 14 allows the hydraulic operated device 2 to obtain a preferred tactile perception when operated.

(17) The non-hydraulic operating unit that includes at least one of the cable operating unit 20 and the electric switch 20a allows for operation of the non-hydraulic operated devices 22 and 22a in addition to the hydraulic operated device 2.

The present invention is not limited to the above embodiment. For example, the above embodiment may be modified as described below.

The cylinder bore 32, the first reservoir tank 40, and the second reservoir tank 50 are not limited to the locations described in the above embodiment and the locations may be changed. Further, the connecting relationship of the cylinder bore 32, the first reservoir tank 40, and the second reservoir tank 50 is not limited and may be changed in a various manners.

Figure 11:
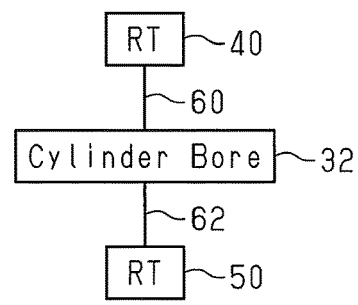
FIGS. 11 to 15 are block diagrams showing modified examples of the bicycle hydraulic operating device.

For instance, in the modified example of FIG. 11, the first reservoir tank 40 and the second reservoir tank 50 are connected in parallel to the cylinder bore 32. In detail, the first reservoir tank 40 is connected to the cylinder bore 32 by the first channel 60. The second reservoir tank 50 is connected to the cylinder bore 32 by the second channel 62.

Figure 12:
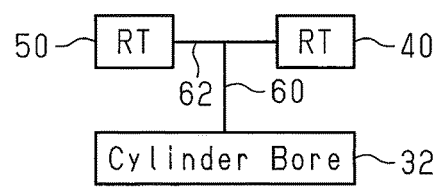

In the modified example of FIG. 12, the first reservoir tank 40 and the second reservoir tank 50 are connected in a tree-like manner to the cylinder bore 32. In detail, the first reservoir tank 40 is connected to the cylinder bore 32 by the first channel 60. The second reservoir tank 50 is connected to the second channel 62, which is branched from the first channel 60. The branched channel may be formed by, for example, sealing an open end of a linear oil channel with a sealing plug from the outer side of the main body 10.

Three or more reservoir tanks may be connected to the cylinder bore 32. For instance, in modified examples of FIGS. 13 to 15, a third reservoir tank 50a is added to the oil channels of FIGS. 10 to 12.

Figure 13:
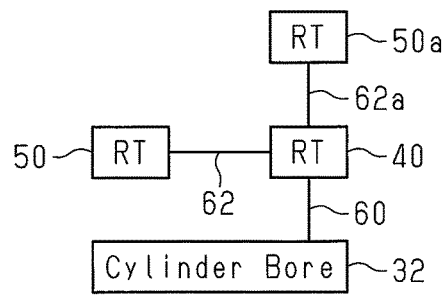

In the modified example of FIG. 13, the first reservoir tank 40 is connected to the cylinder bore 32 by the first channel 60. The second reservoir tank 50 is connected to the first reservoir tank 40 by the second channel 62. The third reservoir tank 50a is connected to the first reservoir tank 40 by a third channel 62a.

Figure 14:
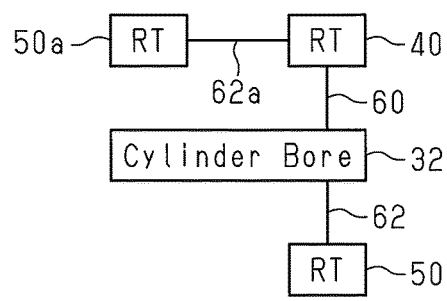

In the modified example of FIG. 14, the first reservoir tank 40 is connected to the cylinder bore 32 by the first channel 60. The second reservoir tank 50 is connected to the cylinder bore 32 by the second channel 62. The third reservoir tank 50a is connected to the first reservoir tank 40 by the third channel 62a.

Figure 15:
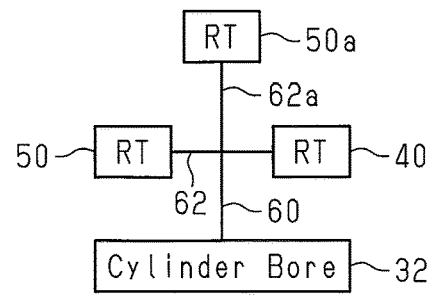

In the modified example of FIG. 15, the first reservoir tank 40 is connected to the cylinder bore 32 by the first channel 60. The second reservoir tank 50 is connected to the second channel 62 that is branched from the first channel 60. The third reservoir tank 50a is connected to the third channel 62a that is branched from the first channel 60 and/or the second channel 62.

In the embodiment of FIG. 10 and the modified examples of FIGS. 11 to 15, the hydraulic operating device 1 is provided with the cylinder 30 including the cylinder bore 32, the first reservoir tank 40, the second reservoir tank 50, the first channel 60 connecting the first reservoir tank 40 to the cylinder bore 32, and the second channel 62 connecting the second reservoir tank 50 to either one of the cylinder bore 32 and the first reservoir tank 40. In addition to the advantages described above, the oil channels may be changed in a variety of manners in accordance with the attachment location and size requirements of the hydraulic operating device 1.

The main body 10, the piston 70, the diaphragms 81 and 82, and the lever 14 may be changed in shape, size, structure, and material. For example, the main body 10 may be a non-metal member such as a synthetic resin member.

The main body 10 may be directly connected to the hydraulic hose 3 without the hose adapter 12.

One of the first diaphragm 81 and the second diaphragm 82 may be omitted.

The lever 14 may include a so-called reach adjustment structure used to adjust the distance between the lever 14 and the handle bar HB in accordance with the user preference or the size of the hand.

The non-hydraulic operating units 20 and 20a may be omitted.

The hydraulic operating device 1 is not limited to a bar-end-embedded type in which the main body 10 is accommodated in the handle bar HB. The hydraulic operating device 1 may be located outside a pipe member. For example, the main body 10 may be fixed outside the handle bar HB by the clamp 18.

The piston 70 is not limited to a pull-type and may be configured as a push-type. An example of a piston push-type hydraulic operating device is described in US 2013/0174543 A1, which is incorporated herein by reference. The US '543 publication describes a dual hydraulic controller including two fluid reservoirs that are respectively in communication with two master cylinders and a dual hydraulic controller including a single fluid reservoir that is in communication with two master cylinders. However, the US '543 publication does not disclose a hydraulic operating device that communicates a plurality of fluid reservoirs with a single master cylinder.

The hydraulic operated device 2 is not limited to a brake caliper and may be any hydraulic operated device that is in fluid connection with the hydraulic operating device 1 through the hydraulic hose 3. Accordingly, the bicycle hydraulic system is not limited to a hydraulic disk brake system and may be configured as any bicycle hydraulic system such as, a hydraulic derailleur system, a hydraulic suspension system, a hydraulic adjustable seatpost or a hydraulic brake system except for a hydraulic disk brake system.

Several of the modified examples may be combined.

It should be apparent to those skilled in the art that the present invention may be embodied in many other specific forms without departing from the spirit or scope of the invention. For example, some of the components may be omitted from the components described in the embodiments (or one or more forms of the embodiments). Further, components in different embodiments may be appropriately combined. The scope of the present invention and equivalence of the present invention are to be understood with reference to the appended claims.

The invention claimed is:

1. A bicycle hydraulic operating device comprising:
a cylinder including a cylinder bore;
a first reservoir tank including a first reservoir opening, wherein the first reservoir tank is in fluid communication with the cylinder bore;
a second reservoir tank including a second reservoir opening, wherein the second reservoir tank is in fluid communication with the cylinder bore; and
a second channel that connects the second reservoir tank to the first reservoir tank, the second channel having a fluid passage cross-sectional area smaller than each of a fluid passage cross-sectional area of the first reservoir tank and a fluid passage cross-sectional area of the second reservoir tank.

2. The bicycle hydraulic operating device according to claim 1, further comprising:
a first diaphragm fitted to the first reservoir opening, wherein the first diaphragm defines a first liquid chamber and a first air chamber in the first reservoir tank; and
a second diaphragm fitted to the second reservoir opening, wherein the second diaphragm defines a second liquid chamber and a second air chamber in the second reservoir tank.

3. The bicycle hydraulic operating device according to claim 2, further comprising:
a first lid that covers the first reservoir opening; and
a second lid that covers the second reservoir opening.

4. The bicycle hydraulic operating device according to claim 1, wherein the first reservoir tank and the second reservoir tank extend in a direction parallel to a cylinder bore axis of the cylinder.

5. The bicycle hydraulic operating device according to claim 4, wherein the first reservoir tank and the second reservoir tank are each located proximate to the cylinder bore in a radial direction of the cylinder bore.

6. The bicycle hydraulic operating device according to claim 1, wherein the first reservoir opening and the second reservoir opening are non-circular.

7. The bicycle hydraulic operating device according to claim 6, wherein the first reservoir opening and the second reservoir opening differ in shape.

8. The bicycle hydraulic operating device according to claim 1, further comprising a first channel that connects the first reservoir tank to the cylinder bore.

9. The bicycle hydraulic operating device according to claim 8, wherein
the first reservoir tank is directly connected to the cylinder bore by the first channel, and
the second reservoir tank is indirectly connected to the cylinder bore via the first reservoir tank and the first channel.

10. The bicycle hydraulic operating device according to claim 8, further comprising:
a bleeding port that connects at least one of the first reservoir tank and the second reservoir tank to outside the bicycle hydraulic operating device; and
a sealing plug coupled to the bleeding port.

11. The bicycle hydraulic operating device according to claim 10, wherein the bleeding port is aligned with the first channel.

12. The bicycle hydraulic operating device according to claim 1, wherein the second channel is connected to the first reservoir tank at a side opposite to the first reservoir opening.

13. The bicycle hydraulic operating device according to claim 12, wherein the second channel is connected to the second reservoir tank at a side opposite to the second reservoir opening.

14. The bicycle hydraulic operating device according to claim 1, further comprising a single main body including the cylinder bore, the first reservoir tank, and the second reservoir tank.

15. The bicycle hydraulic operating device according to claim 14, wherein the main body is configured so that at least a portion of the main body is arranged in a pipe member of a bicycle when the hydraulic operating device is attached to the bicycle.

16. The bicycle hydraulic operating device according to claim 1, further comprising:
a lever provided to pivot about a lever axis between a rest position and an operated position; and
a piston located in the cylinder bore and moved between a home position and an actuated position in accordance with the pivoting of the lever.

17. The bicycle hydraulic operating device according to claim 16, further comprising a non-hydraulic operating unit including at least one of a cable operating unit and an electric switch.

18. A bicycle hydraulic operating device comprising:
a cylinder including a cylinder bore;
a first reservoir tank;
a second reservoir tank;
a first channel that connects the first reservoir tank to the cylinder bore; and
a second channel that connects the second reservoir tank to the first reservoir tank, the second channel having a fluid passage cross-sectional area smaller than each of a fluid passage cross-sectional area of the first reservoir tank and a fluid passage cross-sectional area of the second reservoir tank.

* * * * *